(12) United States Patent
Holmes et al.

(10) Patent No.: US 9,429,041 B2
(45) Date of Patent: Aug. 30, 2016

(54) TURBOMACHINE COMPONENT DISPLACEMENT APPARATUS AND METHOD OF USE

(71) Applicant: General Electric Company, Schenectady, NY (US)

(72) Inventors: James Bradford Holmes, Fountain Inn, SC (US); James Robert Hollis, Greenville, SC (US); David Randolph Spracher, Simpsonville, SC (US); Wayne David Sullivan, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 14/277,232

(22) Filed: May 14, 2014

(65) Prior Publication Data
US 2015/0328729 A1    Nov. 19, 2015

(51) Int. Cl.
| | | |
|---|---|---|
| *F01D 5/28* | (2006.01) | |
| *F01D 25/28* | (2006.01) | |
| *B23P 19/027* | (2006.01) | |
| *B25B 27/14* | (2006.01) | |
| *F01D 5/30* | (2006.01) | |

(52) U.S. Cl.
CPC ........... *F01D 25/285* (2013.01); *B23P 19/027* (2013.01); *B25B 27/14* (2013.01); *F01D 5/3007* (2013.01); *Y10T 29/4932* (2015.01); *Y10T 29/5383* (2015.01)

(58) Field of Classification Search
CPC . B23P 19/027; B23P 19/025; B23P 2700/13; Y10T 29/5383; Y10T 29/53983; Y10T 29/4932; Y10T 29/49323; Y10T 29/49721; F01D 5/005

USPC .......................................................... 173/32
See application file for complete search history.

(56) References Cited

U.S. PATENT DOCUMENTS

| | | |
|---|---|---|
| 2,860,535 A | 11/1958 | Fowler |
| 3,030,702 A | 4/1962 | Fowler |
| 3,171,193 A | 3/1965 | Bowden |
| 3,206,844 A | 9/1965 | Bowden |
| 3,340,593 A | 9/1967 | Dominic |
| 3,564,696 A | 2/1971 | Shepanski |
| 3,611,540 A | 10/1971 | Gibu |
| 3,651,557 A | 3/1972 | Bagley |
| 3,673,668 A | 7/1972 | Crook |
| 3,729,789 A | 5/1973 | Otto |
| 3,755,875 A | 9/1973 | Staab |
| 3,909,916 A | 10/1975 | Neff et al. |

(Continued)

FOREIGN PATENT DOCUMENTS

JP          02298473 A2     12/1990

*Primary Examiner* — Jason L Vaughan
(74) *Attorney, Agent, or Firm* — Ernest G. Cusick; Hoffman Warnick LLC

(57) ABSTRACT

Various embodiments include apparatuses adapted to displace components from a location within a turbomachine. In some embodiments an apparatus for displacing a component of a gas turbine from a first slot in a spacer disk includes a body including a mounting member configured to affixedly attach to a second slot of the spacer disk, a linear actuator coupled to the body and a displacement arm coupled to the linear actuator, the displacement arm actuatable in a first axial direction by the linear actuator to contact the component and displace the component relative to the first slot.

18 Claims, 4 Drawing Sheets

(56) References Cited

U.S. PATENT DOCUMENTS

| | | | |
|---|---|---|---|
| 4,078,290 A | 3/1978 | Fletcher et al. | |
| 4,091,519 A | 5/1978 | Durgan | |
| 4,096,614 A | 6/1978 | Brungard et al. | |
| 4,187,708 A | 2/1980 | Champoux | |
| 4,211,446 A | 7/1980 | Shultz | |
| 4,213,235 A | 7/1980 | Kemmerling | |
| 4,244,553 A | 1/1981 | Escobosa | |
| 4,426,758 A | 1/1984 | Castoe | |
| 4,515,376 A | 5/1985 | Okamuro | |
| 4,551,898 A | 11/1985 | Provost | |
| 4,586,228 A | 5/1986 | Rodolf | |
| 4,649,618 A | 3/1987 | Harrison | |
| 4,662,050 A | 5/1987 | Bryce | |
| 5,013,050 A | 5/1991 | Curtis | |
| 5,033,177 A | 7/1991 | Gathright et al. | |
| 5,075,945 A | 12/1991 | Krzecki | |
| 5,188,506 A | 2/1993 | Creevy et al. | |
| 5,692,282 A | 12/1997 | Baca | |
| 5,709,018 A | 1/1998 | Dugan | |
| 5,904,074 A | 5/1999 | Herbert | |
| 5,971,400 A | 10/1999 | Turnquist et al. | |
| 5,983,474 A | 11/1999 | Koppe et al. | |
| 6,397,447 B1 | 6/2002 | Christopherson et al. | |
| 6,415,487 B1 | 7/2002 | Leimer | |
| 6,502,823 B1 | 1/2003 | Turnquist | |
| 6,543,113 B1 | 4/2003 | Khurana | |
| 6,571,471 B2 | 6/2003 | Hohmann | |
| 6,601,277 B1 | 8/2003 | Swanson | |
| 6,779,239 B2 | 8/2004 | Kefalas et al. | |
| 6,780,089 B2 | 8/2004 | Pan et al. | |
| 6,786,487 B2 | 9/2004 | Dinc et al. | |
| 6,880,217 B2 | 4/2005 | Garst | |
| 6,886,833 B1 | 5/2005 | Von et al. | |
| 6,979,002 B2 | 12/2005 | Ramsay | |
| 7,039,993 B1 | 5/2006 | Smith et al. | |
| 7,066,470 B2 | 6/2006 | Turnquist et al. | |
| 7,121,785 B2 | 10/2006 | Carlson, Jr. | |
| 7,125,223 B2 | 10/2006 | Turnquist et al. | |
| 7,146,697 B2 | 12/2006 | Chan et al. | |
| 7,287,956 B2 | 10/2007 | Bracken et al. | |
| 7,334,305 B2 | 2/2008 | Hadayia, Jr. et al. | |
| 7,354,046 B2 | 4/2008 | Ramsay | |
| 7,455,505 B2 | 11/2008 | Hartmann et al. | |
| 7,526,847 B1 | 5/2009 | Arthur et al. | |
| 7,731,478 B2 | 6/2010 | Chevrette et al. | |
| 7,987,600 B2 | 8/2011 | Erill et al. | |
| 7,996,971 B2 | 8/2011 | Newton | |
| 8,096,030 B2 | 1/2012 | Graichen | |
| 8,117,727 B2 | 2/2012 | McCarvill | |
| 8,167,313 B2 | 5/2012 | Burdgick et al. | |
| 8,382,120 B2 | 2/2013 | Deo et al. | |
| 2007/0137039 A1 | 6/2007 | Ahti et al. | |
| 2009/0265908 A1 | 10/2009 | Corn et al. | |
| 2010/0162546 A1 | 7/2010 | Kalmar et al. | |

TURBOMACHINE COMPONENT DISPLACEMENT APPARATUS AND METHOD OF USE

FIELD OF THE INVENTION

The subject matter disclosed herein relates generally to turbomachine component displacement. More specifically, the disclosure provided herein relates to apparatuses and methods for displacing a turbomachine component from a slot within a spacer disk of a gas turbine.

BACKGROUND OF THE INVENTION

There is often a need for replacement and inspection of turbomachine components. Such components may be difficult to access and remove due to their installation in tight quarters. For example, near flow path seals (NFPSs) of gas turbomachines may become worn and in need of replacement. Removal of such NFPSs is difficult because of the relatively close proximity of one NFPS to another when installed in a working gas turbine. NFPSs are generally installed by sliding their dovetail fittings onto a turbomachine spacer disk. Once installed, removal of a NFPS is difficult as technicians have little free space between components to manipulate removal tools.

Conventional techniques for removal of turbomachine components that are installed in dovetail fittings include the use of vibratory tools such as peening guns, slide hammers, hydraulic rams and hammers to exert a displacing force, e.g. on or near the dovetail fitting of the component. Removal of components using such tools is difficult due to a lack of free space between turbomachine components. Furthermore, such techniques may cause damage to the component being removed, as the hammer may deform or crack the material of the component and/or crack or deform other machine parts if a misdirected strike occurs.

BRIEF DESCRIPTION OF THE INVENTION

Various embodiments include apparatuses adapted to displace a component of a turbomachine. In some embodiments an apparatus for displacing a component of a gas turbine from a first slot in a spacer disk includes a body including a mounting member configured to affixedly attach to a second slot of the spacer disk, a linear actuator coupled to the body and a displacement arm coupled to the linear actuator, the displacement arm actuatable in a first axial direction by the linear actuator to contact the component and displace the component relative to the first slot.

A first aspect provides an apparatus for displacing a component of a gas turbine from a first slot in a spacer disk, the apparatus comprising: a body including a mounting member configured to affixedly attach to a second slot of the spacer disk; a linear actuator coupled to the body; and a displacement arm coupled to the linear actuator, the displacement arm actuatable in a first axial direction by the linear actuator to contact the component and displace the component relative to the first slot.

A second aspect provides an apparatus for displacing a component of a gas turbine from a first slot in a spacer disk, the apparatus comprising: a body configured to accept a removably attachable mounting member having an attachment device for preventing axial movement of the mounting member from a position in a second slot of the spacer disk; a linear actuator coupled to the body; and a displacement arm coupled to the linear actuator, the displacement arm actuatable in a first axial direction by the linear actuator to displace the component from a position within the first slot of the spacer disk A third aspect provides a method of displacing a turbomachine component from position in a first slot of a turbomachine spacer disk, the method comprising: detachably affixing a mounting member of a displacement apparatus to a second slot in the gas turbomachine spacer disk using an attachment device; rotating a displacement arm of the displacement apparatus until the displacement arm contacts the turbomachine component; and displacing the turbomachine component from the position within the first slot by linearly actuating the displacement arm with a linear actuator.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-4, like numbering may represent like elements. Redundant explanation of these elements has been omitted for clarity. Finally, it is understood that the components of FIGS. 1-4 and their accompanying descriptions may be applied to any embodiment described herein.

DETAILED DESCRIPTION OF THE INVENTION

The subject matter disclosed herein relates generally to turbomachine component displacement. More specifically, the disclosure provided herein relates to apparatuses and methods for displacing a turbomachine component from a slot within a spacer disk of a turbomachine.

As indicated herein, displacement of turbomachine components for reasons such as, but not limited to, inspection, maintenance or replacement is often cumbersome and difficult and may result in damage to components. As differentiated from conventional methods, systems and apparatuses for turbomachine component displacement, according to embodiments described herein, may facilitate more efficient and specialized component displacement while lessening the likelihood of damage to the components being displaced and the turbomachine parts near the components.

According to various aspects described herein, turbomachine component displacement apparatuses may be used in a turbine system or in other applications that require displacement of a component that is located in an axially aligned slot adjacent an unoccupied axially aligned slot.

Such slots may be found in gas turbine spacer disks; however, embodiments of the invention are not limited to use with only components disposed in such slots.

Figure 1:
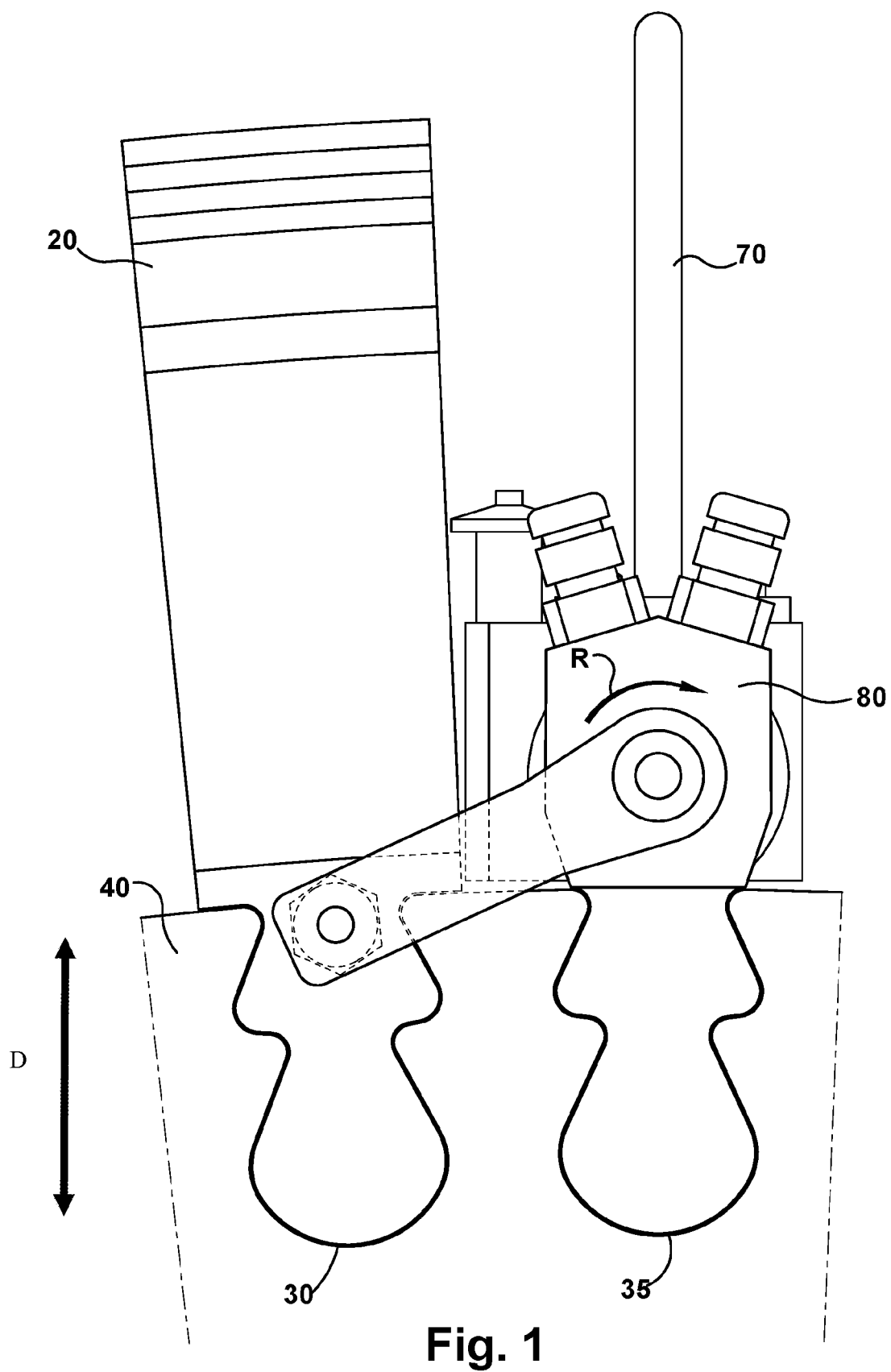
FIG. 1 illustrates a view of an environment for use of apparatuses according to embodiments of the invention.

FIG. 1 illustrates a perspective drawing of an environment for use of a turbomachine component displacement apparatus 10 for displacing a component 20 of a gas turbine from a first slot 30 in a spacer disk 40. Displacement apparatus 10 includes a body 50 which may include materials such as aluminum or steel. The material of body 50 may further include a durable plastic or other suitable material or materials. Body 50 is shown including mounting member 60 which is configured to affixedly attach to a second slot 35 of spacer disk 40. Mounting member 60 is shown having a dove tail shape for mounting within a dove tail shaped slot 30/35 of spacer disk 40, however other shapes are contemplated and are within aspects of the inventive concepts. Mounting member 60 may mount to a slot 30/35 of spacer disk 40 and be temporarily prevented from exiting slot 30/35 via any now-known or later developed detachable affixing system. According to embodiments, mounting member 60 may use a ball lock pin to prevent axial sliding, as illustrated in FIG. 1. In this setting, ball lock pin engages mounting member 60 to slot 30/35. Other means of preventing movement of mounting member 60 from moving within slot 30 include a bolt, a screw or a flange. According to embodiments, a bolt or a screw (not shown) may traverse mounting member 60 and contact slot 30/35 forming an interference fit, in order to prevent mounting member from slipping while apparatus 10 is in use. Also according to embodiments, a bolt or a screw may traverse mounting member 60 and engage in a hole in slot 30/35 akin to ball lock pin. A flange on a non-insertable end of mounting member 60 or a flange on the body may prevent insertion of mounting member 60 past a desired point.

FIG. 1 illustrates mounting member 60 of displacement apparatus 10 in a first slot 30 of a spacer disk 40 and first slot 30 is illustrated adjacent second slot 35, however embodiments of the invention allow for displacement of a component 20 from a non-adjacent slot (not shown). It should be noted that while FIG. 1 illustrates component 20 as a near flow path seal (NFPS) in a slot 30 in a turbomachine spacer disk 40, it is contemplated that displacement apparatus 10 may be used to displace other types of components from similar slots. Displacement apparatus 10 may include contact material 95 for contacting component 20. Contact material 95 may be softer than a material of component 20 and may be selected in order to prevent or reduce damage to component 20 during operation of apparatus 10 and displacement of component 20.

Figure 2:
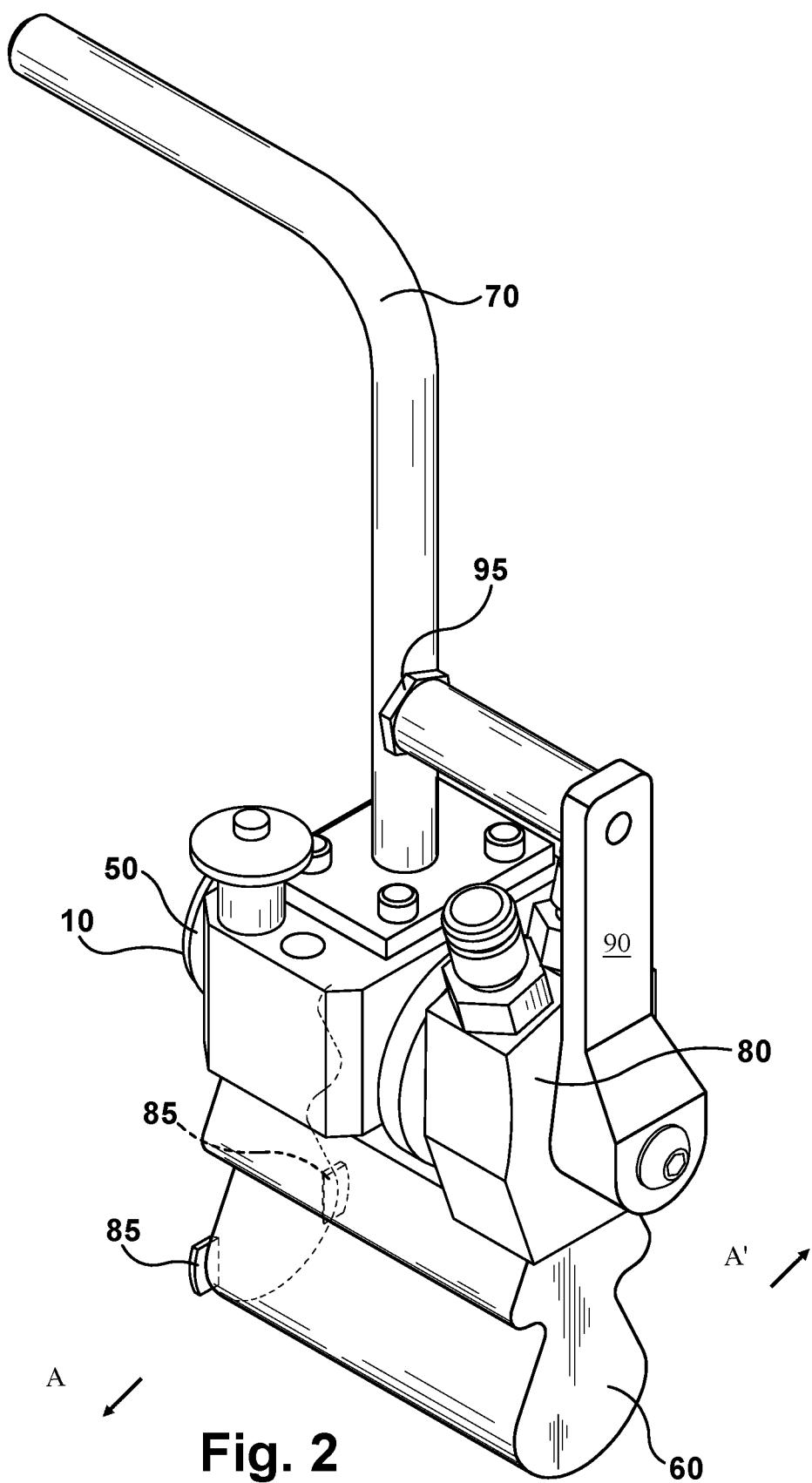
FIG. 2 illustrates a three-dimensional perspective view of an apparatus according to embodiments of the invention.

Turning to FIG. 2, displacement apparatus 10 is illustrated having handle 70 attached to body 50. Handle 70 is to assist a user/technician to maneuver apparatus 10 into a tight space within a turbomachine to properly align apparatus 10 into slot 30, in order to displace a component from second slot 35 (slots 30/35 shown in FIG. 1). FIG. 2 further illustrates linear actuator 80 coupled to body 50 and displacement arm 90 coupled to linear actuator 80. Displacement arm 90 is actuatable in a first axial direction A by linear actuator 80 to contact component 20 and displace component 20 relative to first slot 30. Linear actuator 80 may be a hydraulic ram, including a single-acting hydraulic ram for linearly actuating displacement linear actuator 80 in first axial direction A coincident with the axial direction of slots 30/35. According to embodiments of the invention, linear actuator 80 may be a double-acting hydraulic ram for actuating linear actuator 80 in first axial direction A and in second axial direction A', opposite axial direction A. A double acting hydraulic ram may be useful for removing apparatus 10 after component 20 is displaced, as displacement arm 80 may remain inserted into second slot 35, possibly making removal of apparatus 10 difficult until displacement arm 90 is removed from slot 35. Linear actuator 80 may be adapted to actuate displacement arm 90 in first axial direction A, a distance D at least equal to an axial length D of second slot 35 (as shown in FIG. 1). Linear actuator 80 may include other actuation systems including, but not limited to, a worm screw system (not shown). Such a worm screw system may work to actuate displacement arm 90 in both the first and second axial directions A/A'.

Figure 3:
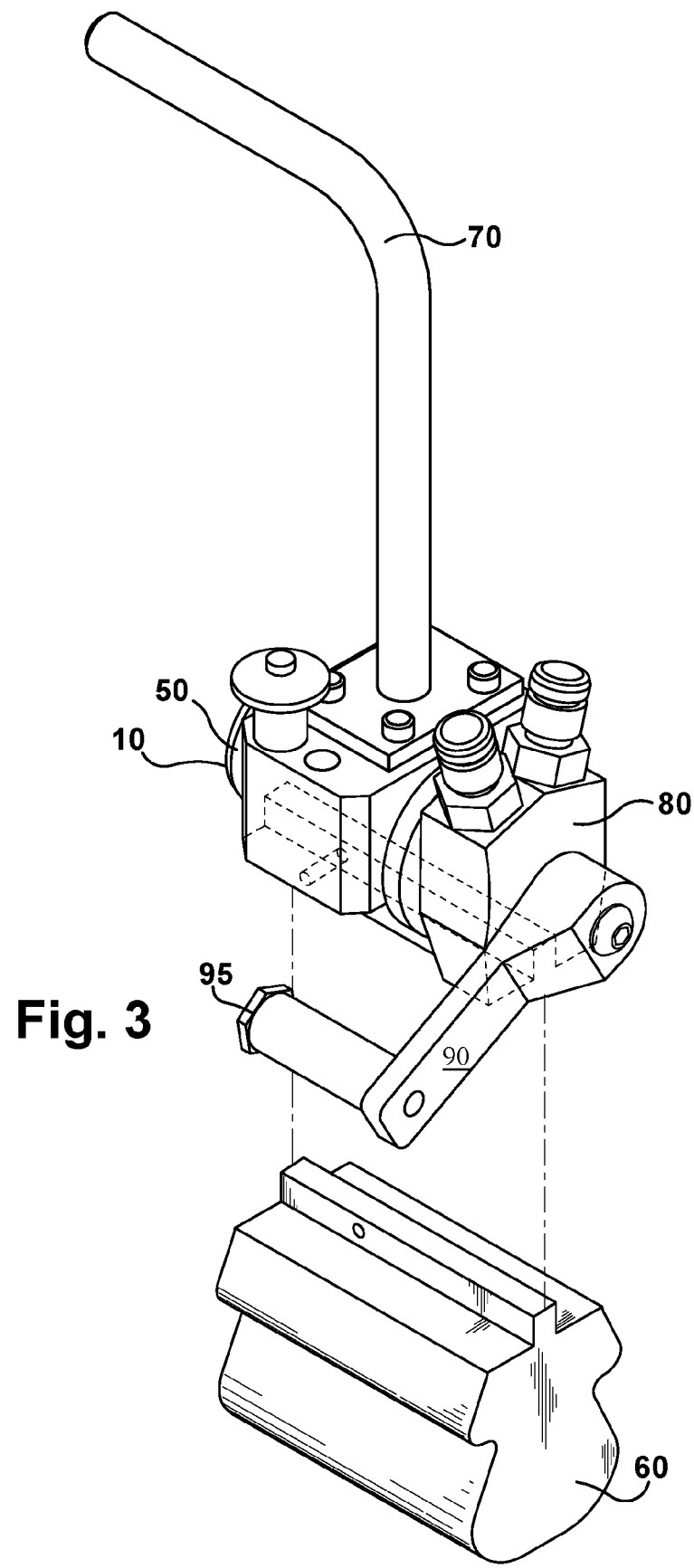
FIG. 3 illustrates a three-dimensional perspective view of an apparatus according to embodiments of the invention.

According to some embodiments, body 50 may be configured to accept a removably attachable mounting member 60 as illustrated in FIG. 3. Removably attachable mounting members 60 may be useful for removal of components 20 from different stages in a turbomachine. Spacer disks 40 of particular stages in a turbomachine may have differently sized slots 30/35, therefore an apparatus with a single sized mounting member 60 may only be useful in displacing components from a single spacer disk, as the mounting member 60 may only fit in slots of a single spacer disk. Therefore, embodiments of the invention allow for interchangeability of differently sized mounting members 60 so that displacement apparatus 10 may be mounted into differently sized slots 30/35 in order to displace components 20 from slots 30/35 of a plurality of sizes. Differently sized mounting members 60 may be shaped to slide into slots 30/35, in an axial direction, as discussed above with respect to mounting members 60. Differently sized mounting member 60 is shown having a dove tail shape for mounting within a dove tail shaped slot 30/35 of spacer disk 40, however other shapes are contemplated and are within aspects of the inventive concepts. Differently sized mounting member 60 may mount to a slot 30/35 of spacer disk 40 and be temporarily prevented from exiting slot 30/35 via any now-known or later developed detachable affixing system.

Figure 4:
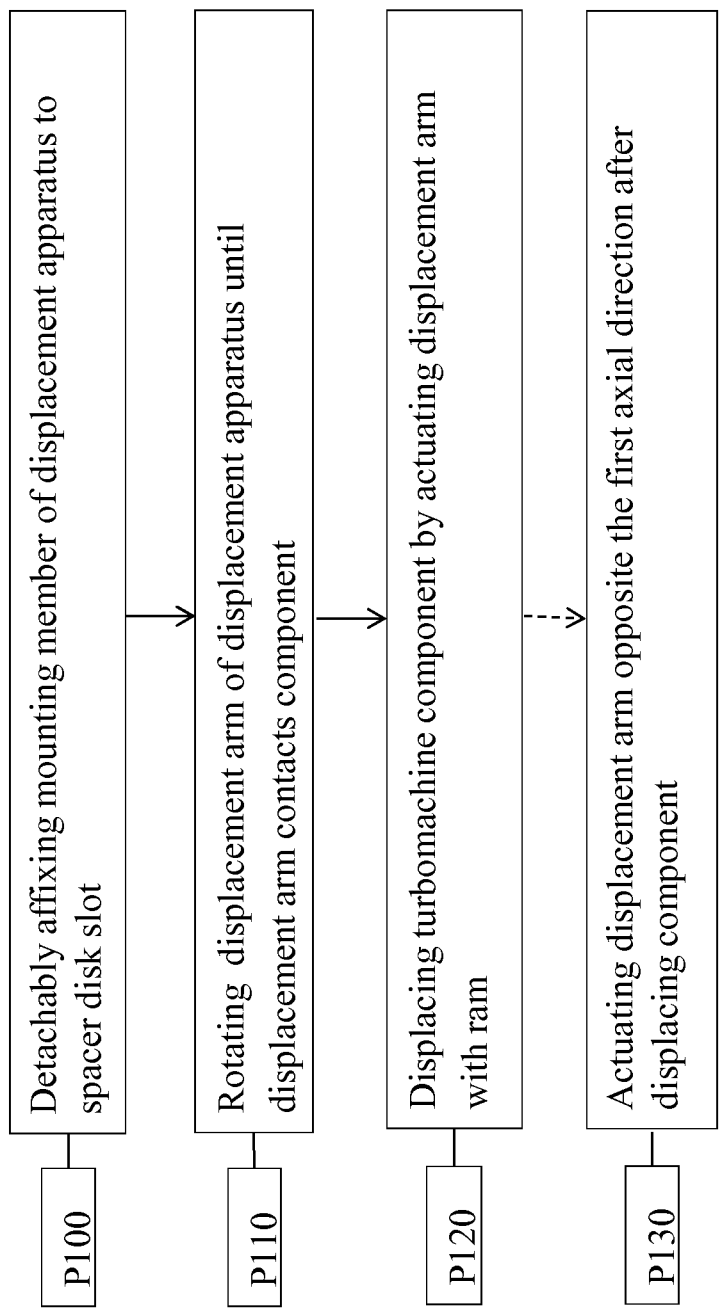
FIG. 4 shows illustrative processes that may be performed in methods according to embodiments of the invention.

FIG. 4 shows illustrative processes that may be performed in methods of displacing a turbomachine component 20 from position in a first slot 30 of a turbomachine spacer disk 40 according to embodiments of the invention. Process P100 includes detachably affixing a mounting member 60 of a displacement apparatus 10 to a second slot 35 in the gas turbomachine spacer disk 40 using an attachment device. As discussed above, mounting member 60 may be detachably affixed to slot 30 via a ball lock pin or via any appropriate detachably attachable system, including, but not limited to a bolt, a screw or a flange, as described above.

Process P110 includes rotating a displacement arm 90 of the displacement apparatus 10 about a central axis A" of linear actuator 80, until the displacement arm 90 contacts the turbomachine component 20, (axis A" is illustrated in FIG. 2). In tight quarters typically found in turbomachines, a displacement arm 90 may need to be rotated in order to contact a component in a slot adjacent to a slot where the mounting member of displacement apparatus 10 is located. Such rotation is illustrated by curved arrow R in FIG. 2

After displacement arm 90 contacts component 20, process P120 may be performed. Process P120 includes displacing turbomachine component 20 from the position within the first slot 30 by linearly actuating displacement arm 90 with linear actuator 80. As discussed above, displacement of component 20 may be performed over a distance D equal to a length of second slot 35, thereby removing component 20 from slot 30. Other embodiments of the invention allow for displacement of component 20 or over a lesser distance. After component 20 is displaced, either fully displaced from slot 35, or simply displaced from an original starting position, optional process P130 may be performed. Optional process P130 includes actuating displacement arm 90 in a second axial direction A', opposite first axial direction A after displacing turbomachine component 20.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "axial" and/or "axially" refer to the relative position/direction of objects along axis A, which is substantially parallel with the long axis of a turbomachine rotor. As further used herein, the terms "radial" and/or "radially" refer to the relative position/direction of objects along radius (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for displacing a component of a turbine from a first slot in a spacer disk, the apparatus comprising:
    a body including a mounting member configured to affixedly attach to a second slot of the spacer disk;
    a linear actuator coupled to the body; and
    a displacement arm coupled to the linear actuator,
    the displacement arm actuatable in a first axial direction by the linear actuator to contact the component and displace the component in the first slot in response to the mounting member being affixedly attached directly to the second slot of the spacer disk.

2. The apparatus of claim 1, wherein the linear actuator includes a hydraulic ram.

3. The apparatus of claim 1, wherein the linear actuator includes a two-way hydraulic ram for actuating the displacement arm in the first axial direction and a second axial direction.

4. The apparatus of claim 1, wherein the component includes a near flow path seal.

5. The apparatus of claim 1, wherein the attachment device includes a ball lock pin.

6. The apparatus of claim 1, wherein the first slot is adjacent the second slot.

7. The apparatus of claim 1, wherein the linear actuator is adapted to actuate the displacement arm in the first axial direction a distance at least equal to an axial length of the second slot.

8. The apparatus of claim 1, wherein the first axial direction coincides with an axial direction of the first slot.

9. The apparatus of claim 1, wherein the displacement arm includes a contact material for contacting the component.

10. An apparatus for displacing a component of a gas turbine from a first slot in a spacer disk, the apparatus comprising:
    a body configured to accept a removably attachable mounting member having an attachment device for preventing axial movement of the mounting member from a position in a second slot of the spacer disk;
    a linear actuator coupled to the body; and
    a displacement arm coupled to the linear actuator,
    the displacement arm rotatable about the linear actuator and with respect to the linear actuator, the displacement arm rotatable from a first position to a second position, the first position offset from the second position,
    the displacement arm actuatable in a first axial direction by the linear actuator to displace the component from a position within the first slot of the spacer disk.

11. The apparatus of claim 10, wherein the linear actuator includes a hydraulic ram.

12. The apparatus of claim 10, wherein the linear actuator includes a two-way hydraulic ram for actuating the displacement arm in the first axial direction and a second axial direction.

13. The apparatus of claim 10, wherein the component includes a near flow path seal.

14. The apparatus of claim 10, wherein the attachment device includes a ball lock pin.

15. The apparatus of claim 10, wherein the first slot is adjacent the second slot.

16. The apparatus of claim 10, wherein the linear actuator is adapted to actuate the displacement arm in the first axial direction a distance at least equal to an axial length of second slot.

17. The apparatus of claim 10, wherein the first axial direction coincides with an axial direction of the first slot.

18. The apparatus of claim 10, wherein the displacement arm includes a contact material for contacting the component.

* * * * *